Nov. 8, 1960     E. L. KAEGEBEIN     2,959,442

KITCHEN APPLIANCE

Filed June 11, 1958

INVENTOR
E.L. KAEGEBEIN

BY *[signature]*

ATTORNEY

United States Patent Office 2,959,442
Patented Nov. 8, 1960

2,959,442

KITCHEN APPLIANCE

Erich L. Kaegebein, 8148 Kooy Drive, Munster, Ind., assignor of one-fourth to Bertha Z. Kaegebein and one-fourth to Donald E. Kaegebein, both of Munster, Ind., and one-fourth to Sidney Vander Werff, Lansing, Ill.

Filed June 11, 1958, Ser. No. 741,279

1 Claim. (Cl. 294—31)

This invention relates to utensils of various kinds including those employed in the culinary department in the preparation, handling and serving of foods as well as for the preservation of the food in its original state, the protection from burning, and for facilitating the accomplishment of a job.

The invention relates more particularly to culinary devices or appliances of particular use in the kitchen or other place where food is prepared for lifting hot foods such as roasts, fowl or the like, or containers such as casseroles, pots, pans, dishes and other objects containing pies, cakes or other substances, and not desired to be touched by a fork or by the hands.

Various types and kinds of tools or utensils have been employed for use in the kitchen and outside around stoves and the like where hot dishes and foods are to be found, however, the devices of this general character heretofore employed have been for individual or limited use, have not permitted food such as a roast or fowl to be handled intact after they have been cooked and browned, but have pierced or torn apart the food so that the juices could escape.

It is an object of the invention to provide an appliance of wide application capable of being used in connection with the handling of roasts of large size as well as other hot food including those in receptacles without injury to the handler, or the material handled.

Another object of the invention is to provide a kitchen appliance of simple and inexpensive construction, which is easier and quicker to use, will prevent injury from burns, marring of the appearance of the food, which is constructed so that it can be employed in the handling of various and sundry foods and other articles, as well as an appliance by which not only is handling simplified but it is rendered positive to avoid the dropping of the thing handled.

Another object of the invention is to provide a culinary appliance for the home, restaurant or hotel, having a wide application of use, which may be readily cleaned, having nothing to get out of order, and which can be used for handling roasts, fowl, dishes, pots, pans and the like.

Figure 1:
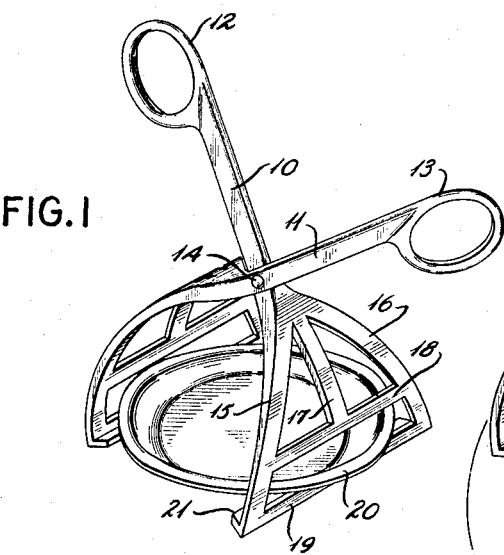
Figure 2:
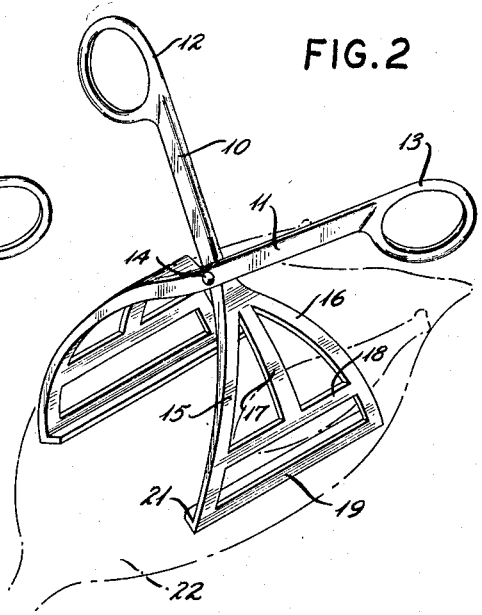
Figure 3:
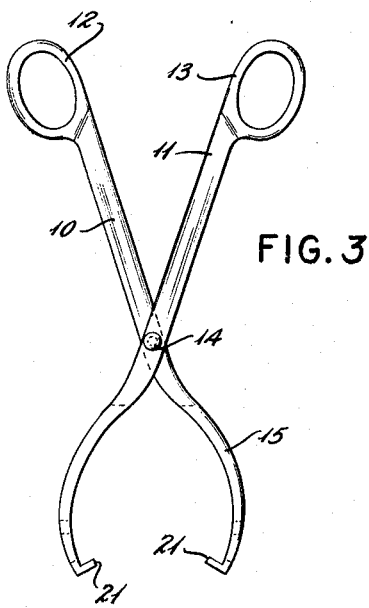

Other objects and advantages of the invention will become apparent from the following description taken in conjunction with the accompanying drawing wherein:

Fig. 1 is a perspective view of a novel kitchen appliance of the present invention illustrating one applied use thereof;

Fig. 2, a perspective view similar to Fig. 1 illustrating another use;

Fig. 3, a front elevation; and

Figure 4:
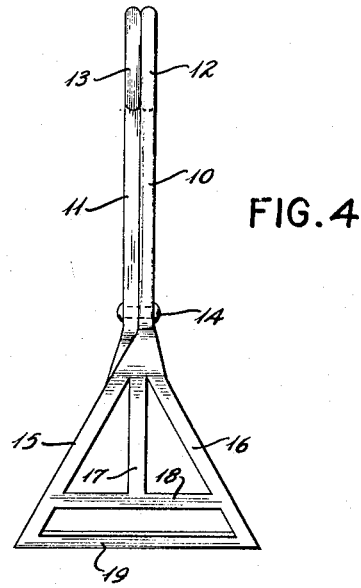

Fig. 4, an edge view.

Briefly stated the invention comprises a kitchen appliance in the form of lifting tongs having oval openings for the reception of the fingers at one end and at the other end enlarged outwardly disposed inverted V-shaped jaws between which objects are adapted to be received in order that they may be handled without being contacted by the human hands.

The jaws are generally concave on their inner surfaces to facilitate the gripping of a roast, a chicken or another object having a generally convex exterior surface. Also the outer wide extremities of the jaws are of a configuration to accommodate objects of various kinds, each of the jaws being provided with an inturned ledge forming flange or gripping edge and a parallel opening thereabove for engagement with or to receive the flange of a pan or other object.

With continued reference to the drawing the kitchen appliance of the present invention comprises a pair of tongs 10 and 11, having finger openings 12 and 13 respectively at one end, the tongs being connected by a pivot forming rivet or fastener 14.

At the opposite end from the finger openings the tongs are provided with outwardly disposed inverted V-shaped jaws with generally concave inner surfaces to facilitate engagement with objects.

The jaw attached to the tong 10 has diverging side bars 15 and 16, an angle dividing reinforcing center bar 17, and a pair of parallel end bars 18 and 19 across the wide end of the jaw and spaced the proper amount to receive the rim of a dish or pan 20.

Attached to the bar 19 is an inwardly disposed article engaging and holding ledge 21 for cooperation with a similar ledge on an opposed jaw of similar character carried by the tong 11. These ledges are adapted to be horizontally disposed beneath cake tins with rolled edges or the like for lifting and transporting the same. In like manner the jaws of the tongs may be used to pick up a chicken 22, a roast, casserole, pie tin and the like.

It will be apparent that the kitchen utensil of the present invention is of wide application although of simple and inexpensive construction and is handy and easy to use whenever cooking is done and elsewhere when contact of an object with the fingers or sticking with a fork is desired to be avoided.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

A kitchen tong comprising a pair of levers pivotally connected together intermediate their ends, one end of each lever providing an operating handle for causing pivotal movement and for supporting the tongs, the other end of each lever being provided with laterally extending enlargements which extend in a direction substantially parallel to the pivotal axis between the levers providing jaws, each jaw having an inwardly extending flange at the extremity thereof substantially parallel to the pivotal axis and extending at an acute angle to a radial line from the pivot axis to the end of the jaw, each jaw being provided with a substantially trapezoidal slot extending substantially the width of the slot and in which the longer base is adjacent the end of the jaw and the shorter base is between such end and the axis with the slant sides of the trapezoidal slots making substantially equal angles with the base whereby the tongs may be used for supporting objects of varying dimension and provide for effective three point support in at least one jaw and at least one point support in the other jaw thereby assuring positive control of objects of varying diameter and varying sizes.

References Cited in the file of this patent

UNITED STATES PATENTS

| | | |
|---|---|---|
| 932,258 | Fasenmyer | Aug. 24, 1909 |
| 1,260,111 | Wickersham | Mar. 19, 1918 |